(12) United States Patent
Howe et al.

(10) Patent No.: US 8,763,492 B2
(45) Date of Patent: Jul. 1, 2014

(54) MULTI-PIECE SHIFTER CABLE SYSTEM

(71) Applicant: Dura Operating LLC, Auburn Hills, MI (US)

(72) Inventors: Brian D. Howe, Shelby Township, MI (US); Steven P. Levesque, Rochester Hills, MI (US)

(73) Assignee: Dura Operating LLC, Auburn Hills, MI (US)

( * ) Notice: Subject to any disclaimer, the term of this patent is extended or adjusted under 35 U.S.C. 154(b) by 0 days.

(21) Appl. No.: 13/633,365

(22) Filed: Oct. 2, 2012

(65) Prior Publication Data

US 2014/0090511 A1    Apr. 3, 2014

(51) Int. Cl.
*F16C 1/22* (2006.01)

(52) U.S. Cl.
USPC .......................................... 74/502.6

(58) Field of Classification Search
USPC .................................. 74/502.4, 502.5, 502.6
See application file for complete search history.

(56) References Cited

U.S. PATENT DOCUMENTS

| | | | |
|---|---|---|---|
| 4,541,658 A | 9/1985 | Bartholomew | |
| 4,682,513 A | 7/1987 | Reeder | |
| 4,798,098 A | 1/1989 | Keller et al. | |
| 5,002,315 A | 3/1991 | Bartholomew | |
| 5,039,138 A | 8/1991 | Dickirson | |
| 5,413,387 A | 5/1995 | Bartholomew | |
| 5,509,750 A | 4/1996 | Boike | |
| 5,518,332 A | 5/1996 | Katoh | |
| 5,536,103 A | 7/1996 | Sawada | |
| 5,575,180 A | 11/1996 | Simon | |
| 5,577,415 A | 11/1996 | Reasoner | |
| 5,632,182 A | 5/1997 | Reasoner | |
| 5,655,415 A * | 8/1997 | Nagle et al. | 74/502.6 |
| 5,664,462 A * | 9/1997 | Reasoner | 74/502.4 |
| 5,779,279 A | 7/1998 | Bartholomew | |
| 5,823,063 A | 10/1998 | Nagle et al. | |
| 5,826,920 A | 10/1998 | Bartholomew | |
| 6,010,160 A | 1/2000 | Bartholomew | |
| 6,056,020 A | 5/2000 | Malone | |

(Continued)

FOREIGN PATENT DOCUMENTS

| | | |
|---|---|---|
| EP | 0444780 A1 | 9/1991 |
| EP | 0834661 A1 | 4/1998 |
| KR | 1020110089566 | 8/2011 |

OTHER PUBLICATIONS

Written Opinion & International Search Report for PCT/US13/062857, Jan. 6, 2014, 9 pages.

*Primary Examiner* — Vicky Johnson
(74) *Attorney, Agent, or Firm* — Reising Ethington P.C.; Matthew J. Schmidt; Dean B. Watson

(57) ABSTRACT

In one embodiment there is provided a multiple piece shifter cable system. The cable pieces may each have a core section with a connector and a conduit section with a connector. The core connectors may be coupled together to connect the core sections of the cable pieces and the conduit connectors may be coupled together to connect the conduit sections of the cable pieces. When the conduit connectors are mated together the core connectors may automatically be mated together, and the core connectors may automatically be locked together as well. In at least some implementations, the conduit connectors may permit adjustment of the total length of the conduit during assembly, and a clamp may be provided to maintain the conduit connectors in a desired assembled position.

18 Claims, 4 Drawing Sheets

(56) References Cited

U.S. PATENT DOCUMENTS

| | | |
|---|---|---|
| 6,102,609 A | 8/2000 | Tsuge |
| 6,119,544 A | 9/2000 | Cebollero |
| 6,247,380 B1 | 6/2001 | Cebollero |
| 6,561,057 B2 * | 5/2003 | Cebollero ............... 74/502.4 |
| 2001/0013260 A1 | 8/2001 | Cebollero |

* cited by examiner

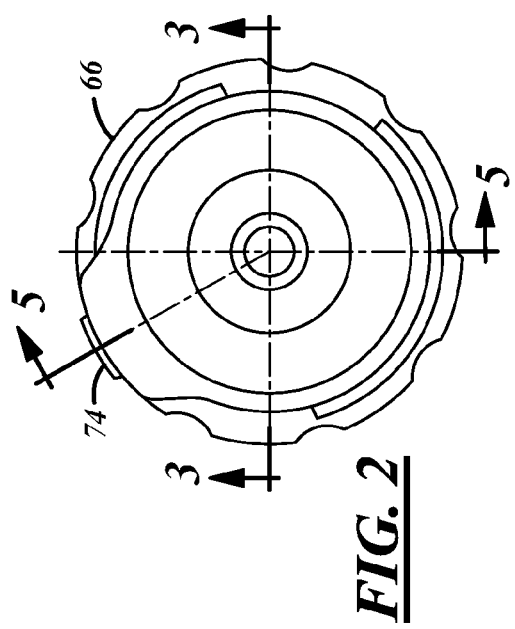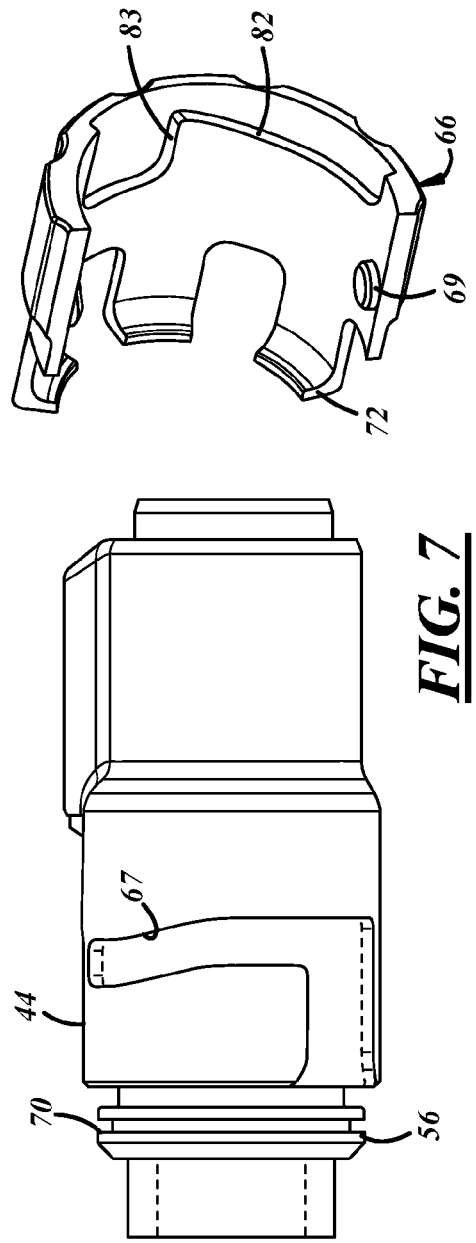

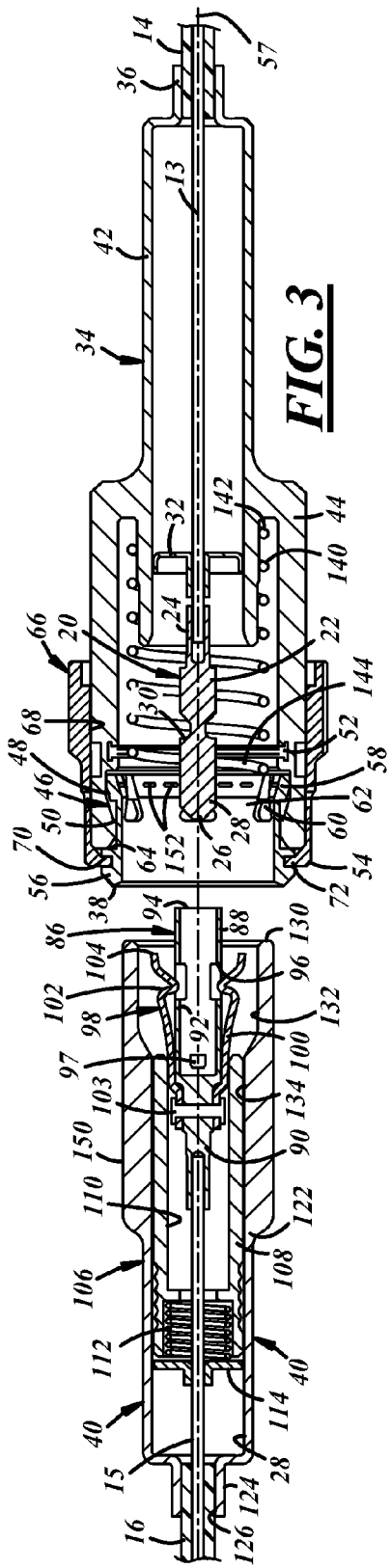
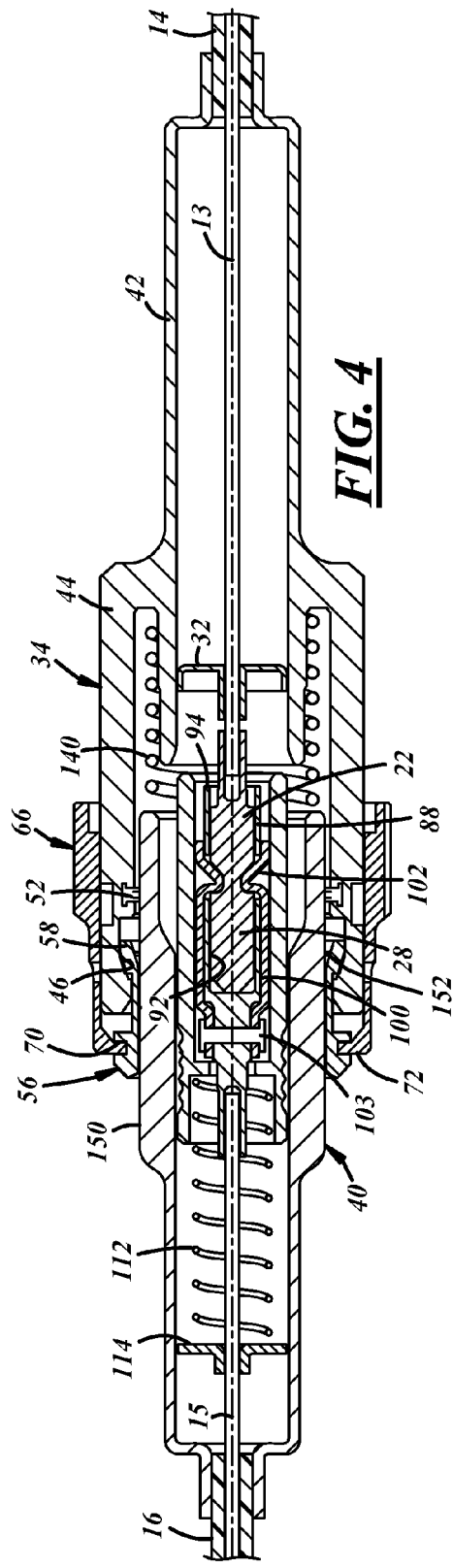
FIG. 3
FIG. 4

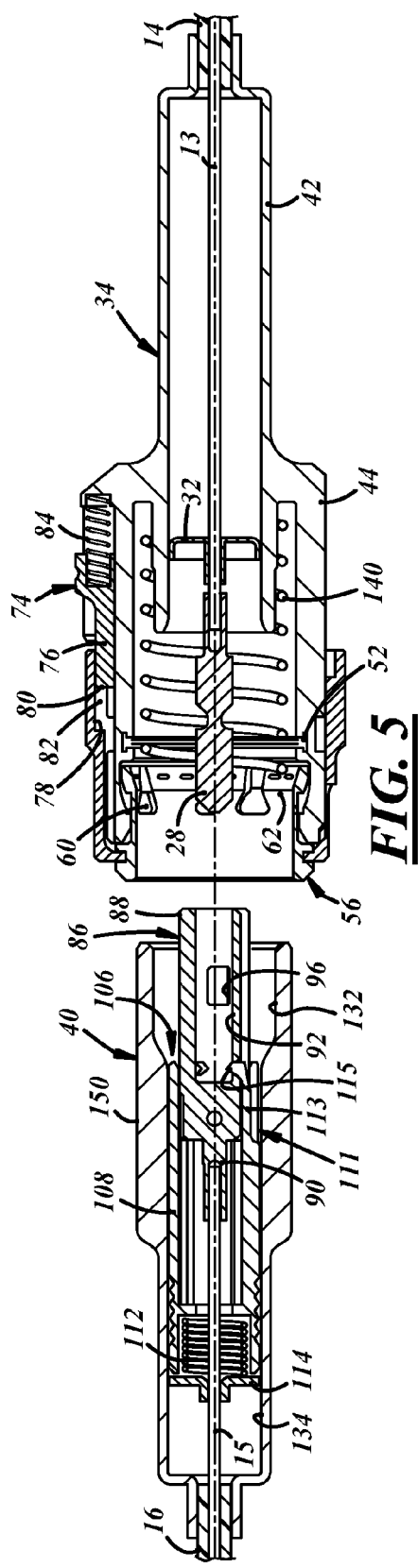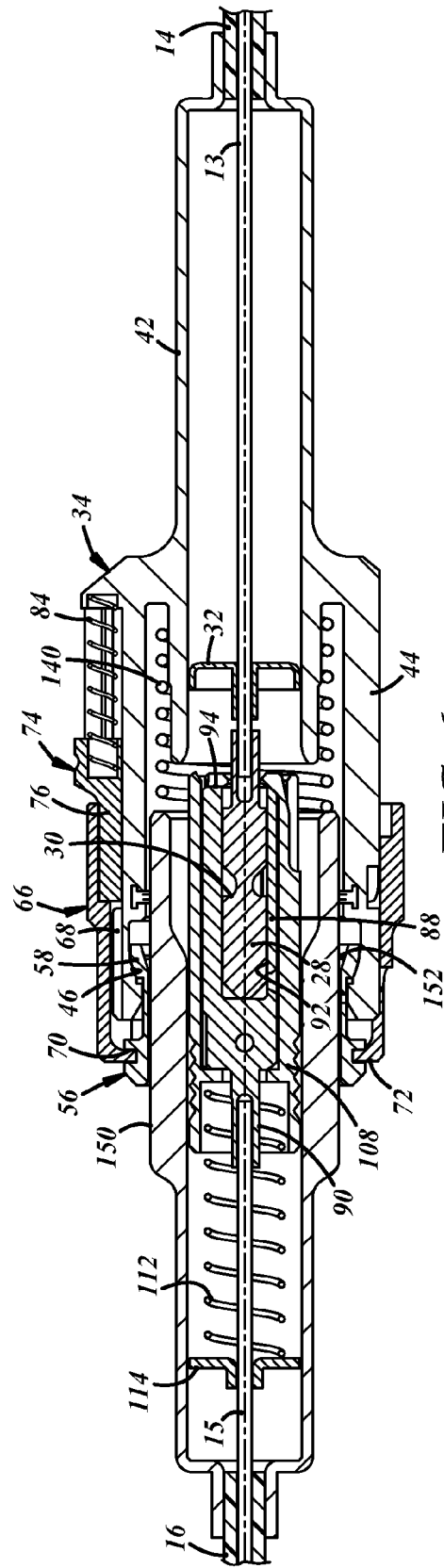

MULTI-PIECE SHIFTER CABLE SYSTEM

TECHNICAL FIELD

The present disclosure relates to shift cable systems for a vehicle transmission, and more particularly to a multi-piece shift cable system.

BACKGROUND

Shift cables come in many different forms. Examples of cable systems include U.S. Pat. Nos. 5,632,182; 6,056,020; 5,577,415; 5,664,462; 5,575,180; 5,509,750; 6,561,057; 6,247,380; 6,119,544; 5,413,387; 5,002,315; 4,541,658; 5,826,920; 6,010,160; 5,779,279; 5,039,138; 5,518,332; 5,536,103; 4,682,513; 6,102,609; 5,655,415; 5,823,063.

What is needed is a multi-part, shift cable system that is easy to connect the cable core pieces together and the conduit pieces together while at the same time being serviceable.

SUMMARY

In one embodiment there is provided a multiple piece push-pull shift cable system. The cable pieces may each have a core section with a connector and a conduit section with a connector. The core connectors may be coupled together to connect the core sections of the cable pieces and the conduit connectors may be coupled together to connect the conduit sections of the cable pieces. When the conduit connectors are mated together the core connectors may automatically be mated together. In at least some implementations, the core connectors may automatically be locked together as well.

In another embodiment there is provided a push-pull shift cable system, having multiple core sections coupled together with mating connectors and corresponding multiple conduit sections coupled together so that the total length of the cable conduit may be adjusted at the connector while providing a secure connection of the core and conduit sections. A clamp may be provided to releasably maintain the first and second conduit connectors coupled together. The clamp may also include or cooperate with a retainer that can be separately moved prior to releasing the clamp to prevent or inhibit unintended release of the clamp.

In another embodiment there is provided a push-pull shift cable system having multiple core sections with mating connectors and corresponding multiple conduit sections with mating connectors wherein when the conduit connectors are mated together the core connectors are mated together and releasably locked together by a lock that is yieldably biased toward its unlocked position. To permit service of the cable assembly, the conduit connectors may be disconnected and the lock released to its unlocked position to permit the core connectors to be disconnected.

In another embodiment there is provided a push-pull shift cable system, having multiple flexible core sections with mating connectors, a lock preloaded in an unlocked position and autonomously moved to its locked position when the core connectors are mated together. In at least some implementations, the lock may include a trigger that is automatically released when the core connectors are mated or seated together.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which:

FIG. 2 is an end view of a cable system for coupling together first and second cable sections;

FIG. 3 is a sectional view of the cable system taken generally along line 3-3 in FIG. 2 and showing the cable sections separated from each other;

FIG. 4 is a sectional view like FIG. 3 but showing the cable sections coupled together;

FIG. 5 is a sectional view of the cable system taken generally along line 5-5 in FIG. 2 and showing the cable sections separated from each other;

FIG. 6 is a sectional view like FIG. 5 but showing the cable sections coupled together; and FIG. 7 is an exploded view of some components of a clamp associated with one conduit connector.

DETAILED DESCRIPTION OF PREFERRED EMBODIMENTS

Figure 1:
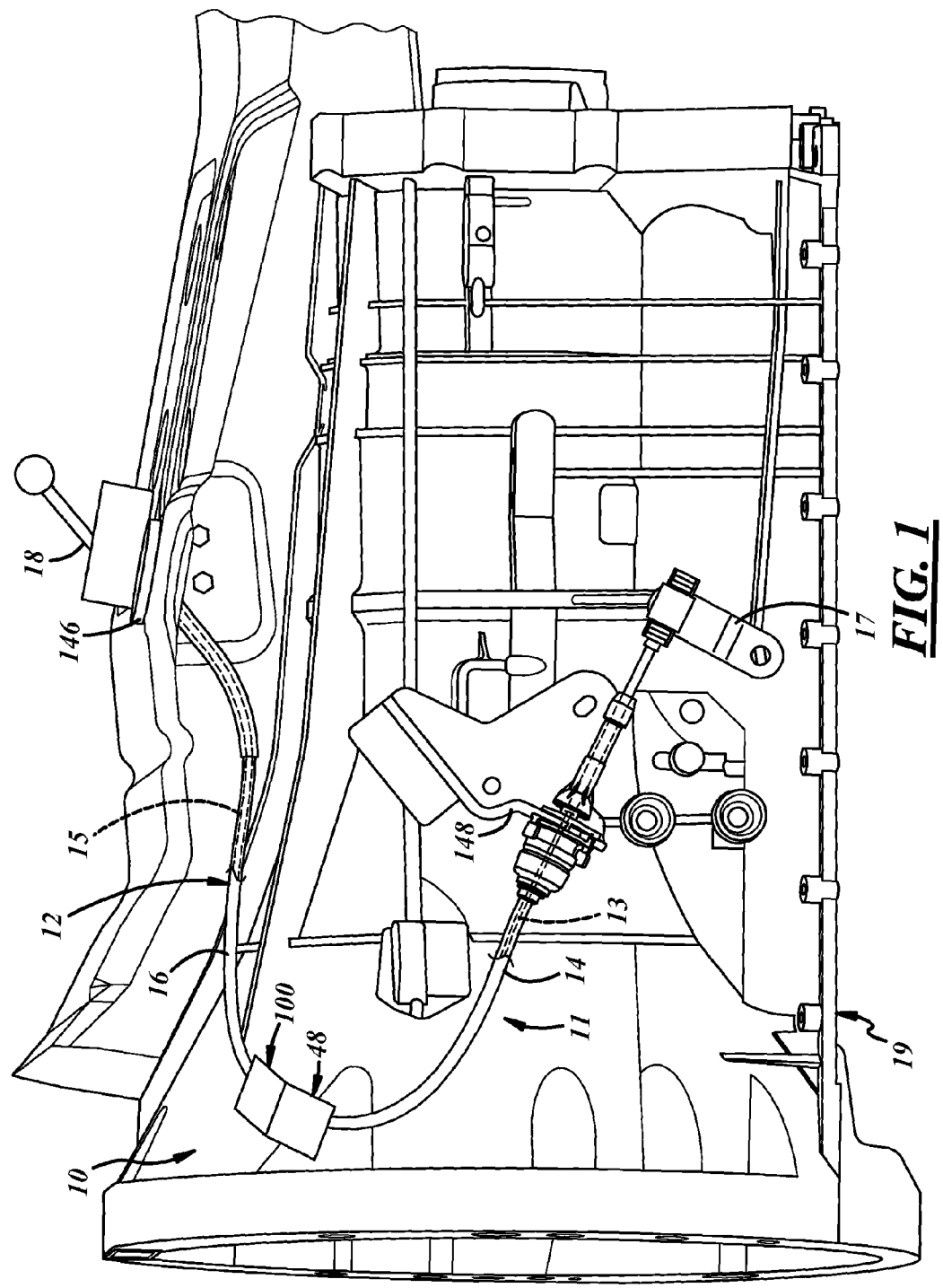
FIG. 1 is an overview of one implementation of a transmission shifter assembly having a multi-piece shift cable assembly connecting a shift lever to a transmission shifter.

Referring in more detail to the drawings, FIGS. 1-6 illustrate a cable system 10 having multiple pieces of cable adapted to be connected together. As shown in FIG. 1, in at least one embodiment, the cable system 10 includes a first cable section 11 and a second cable section 12. The first cable section 11 may include a first core section 13 which may be a flexible stranded wire and a first conduit section 14 that may be plastic and tubular and in which at least a portion of the first core section is slidably received. The second cable section 12 may include a second core section 15 which may be a flexible stranded wire and a second conduit section 16 that may be plastic and tubular and in which at least a portion of the second core section is slidably received. The first core section 13 may be coupled to a first component 17, the second core section 15 may be coupled to a second component 18 and the first and second core sections 13, 15 may be coupled together to transmit force from one component to the other through the coupled cable sections 11, 12.

In one implementation, as shown in FIG. 1, the first component 17 may be a shift control arm for a vehicle transmission 19 and the second component 18 may be a vehicle shifter assembly such as may be controlled and manipulated by a driver of a vehicle. The first core section 13 and first conduit section 14 may be coupled, respectively, to the second core section 15 and second conduit section 16 so that the vehicle shifter assembly can control movement of the transmission shift lever via the coupled cable sections 11, 12 which form a generally unitary push-pull cable when coupled together. To accomplish this, the cable sections 11, 12 may each include couplers for the conduit and core that are adapted to be mated together. In at least one implementation, connection of the first and second core section 13, 15 is controlled or occurs automatically as the first and second conduit sections 14, 16 are coupled together. This may facilitate coupling both the conduit sections 14, 16 and core sections 13, 15 to facilitate assembly and installation of the cable system 10. The first and second cable sections 11, 12 may also be removably connected together so that they may be separated and the cable system 10 may be serviced. Of course, the cable system 10 may be used in applications other than a transmission shifter implementation.

As shown in FIG. 3, at its end opposite the end connected to the transmission shift control arm 17, the first core section 13 may be coupled to a first core connector 20. The first core connector 20 may include a body 22 coupled at a first end 24 to the first core section 13 and extending axially from the first core section 13. At its second end 26, the body 22 may include a head 28 and axially spaced from the head, a necked down or reduced diameter portion 30 may be provided between the first end 24 and the head 28. The body 22 may be generally cylindrical, although other shapes may be used as desired. A retainer 32 may be coupled to the first core connector 20 and/or the first core section 13 to maintain the first core connector 20 generally coaxially centered with a first conduit connector 34 that surrounds at least a portion of the first core connector 20 in the implementation shown.

The first conduit connector 34 is coupled to the first conduit section 14 at a first end 36 and is open at its second end 38 for receipt of a second conduit connector 40 coupled to the second conduit section 16, as will be set forth in more detail herein. The first conduit connector 34 may include a first tubular portion 42 extending from its first end 36 and through which a portion of the first core section 13 extends. The retainer 32 may be received within the first tubular portion 42 to maintain the core section 13 and connector 20 generally coaxially aligned with the tubular portion. The first conduit connector 34 may also include an outer tube 44 extending axially and radially outwardly from the first tubular portion 42 and defining the open second end 38 of the first conduit connector 34. Adjacent to but inboard of the second end 38, a tapered cam surface 46 may be provided. The cam surface 46 may extend axially from a first end 48 to a second end 50 where the second end is located closer to the second end 38 of the first conduit connector 34. In the implementation shown, the cam surface 46 has a decreasing radial dimension as it extends axially from its first end 48 to its second end 50, although other arrangements are possible. A seal 52 may be carried by the outer tube 44 to inhibit contaminants from entering the interior of the cable assembly 10 when the first and second core and conduit sections are coupled together.

The first conduit connector 34 may also include a conduit lock or clamp 54. The clamp 54 may be any device or feature adapted to engage the second conduit connector 40 to inhibit or prevent, under at least certain loads, relative movement between the first and second conduit connectors. In the implementation shown, the clamp 54 may have or be defined by an annular sleeve 56 that may be received within and at least partially axially overlapped by the outer tube 44. A portion of the sleeve 56 is located adjacent to and adapted to engage the cam surface 46 such that axial movement of the sleeve 56 (that is, movement generally along or parallel to a center axis 57 of the first conduit connector 34) in a direction tending to remove the sleeve 56 from the outer tube 44 moves a portion of the sleeve 56 against and relative to the cam surface 46. That portion of the sleeve 56 may be located at a first end 58 of the sleeve 56 and may extend or be flared radially outwardly to facilitate engagement with the cam surface 46. The sleeve 56 may move from a retracted position shown in FIGS. 3 and 5 to an advanced position shown in FIGS. 4 and 6. During this movement of the sleeve 56, the engagement of the sleeve 56 with the cam surface 46 radially inwardly displaces at least that portion of the sleeve 56 that is engaged with the cam surface 46. To increase the flexibility of the sleeve 56 and facilitate its radial displacement when acted upon by the cam surface, one or more slots 60 may be provided in the sleeve 56 to thereby define individual flexible fingers 62 at the first end of the sleeve. The fingers 62 may be displaced inwardly during the slidable engagement with the cam surface 46 and also facilitate insertion of the sleeve 56 into the outer tube 44 through an opening 64 that is smaller in diameter than most or all of the cam surface 46.

The clamp 54 may also include an actuator 66 to drive the sleeve 56 between its retracted and advanced positions. The actuator 66 may be coupled to the sleeve 56 and include or be defined by a collar surrounding at least a portion of the outer tube 44. The collar 66 may be rotatably carried by the outer tube 44, such as by one or more mating or interrelated cam features in the collar 66 and outer tube 44. In the implementation shown, the outer tube 44 includes one or more cam slots 67 and the collar 66 includes at least one follower 69 which may be in the form of a small knob or button that travel(s) within the cam slot(s) 67, as shown in FIG. 7. As the collar 66 is rotated, the followers slide along within and engage the cam slots 67 to axially displace the collar as it is rotated relative to the outer tube 44. In the implementation shown in FIGS. 3-6, the collar 66 can be moved from a retracted position shown in FIGS. 3 and 5 to an advanced position shown in FIGS. 4 and 6. Of course, other mechanisms or features may be used to axially displace the collar, such as one or more threads. To couple the collar 66 with the sleeve 56, the sleeve 56 may include a connection feature, which is shown in this implementation as a slot 70 formed in an outer surface of the sleeve 56. The slot 70 may receive an inwardly extending flange 72 of the collar 66 so that the sleeve 56 moves axially with the collar 66. While it could, the sleeve 56 need not rotate with the collar 66 as the collar rotates. That is, the connection feature can, if desired, allow relative rotational movement between the collar 66 and sleeve 56.

As best shown in FIGS. 5 and 6, the first conduit connector 34 may also include a clamp retainer 74 that selectively prevents rotation of the collar 66 to, for example, hold the collar 66 in its advanced position. This may prevent unintended movement of the collar 66, which would cause movement of the sleeve 56 and thereby could affect the coupling together of the first and second conduit connectors 34, 40. The clamp retainer 74 may include a body 76 slidably received at least partially within a pocket 78 formed in the first conduit connector 34. The clamp retainer 74 may have a free end 80 that is received between the collar 66 and the outer tube 44 and axially engages a circumferentially extending shoulder 82 formed in the collar 66, as shown in FIGS. 5 and 7. In this position, the collar 66 can be rotated a certain amount and the free end 80 of the retainer 74 will stay engaged with the shoulder 82. When the collar 66 is rotated sufficiently that the shoulder 82 is no longer axially aligned with the retainer 74, the retainer 74 may be axially moved to its advanced position shown in FIG. 6. When the retainer 74 is in its advanced position, rotation of the collar 66 in a direction tending to axially retract the collar 66 back toward its position shown in FIG. 5, is prevented. This rotation may be prevented by circumferential engagement of the shoulder 82 or other stop surface 83 (FIG. 7) on the collar 66 with a side of the retainer body 76. Further, as shown, the retainer 74 may be yieldably biased toward its advanced position (e.g. by a spring 84) such that once clear of the shoulder 82 the retainer 74 will autonomously move to its advanced position. Thereafter, to permit the collar 66 to be rotated in the direction causing the collar 66 to axially retract, the retainer 74 must be retracted against the force of its spring 84 so that the free end 80 is clear of the shoulder 82.

Turning now to the second cable section 12, the second core section 15 may include a second core connector 86. The second core connector 86 may include a main body 88 coupled to the second core section 15 at one end 90 and having a cavity or socket 92 that extends to and is open at its opposite end 94. The socket 92 may be constructed and arranged to receive at least a portion of the head 28 of the first core connector 20. The main body 88 may be generally tubular or any other shape, and have one or more lock openings 96 through an outer wall and extending to the socket 92. One or more secondary openings 97 may also be provided axially spaced from the lock openings 96 and also open to the socket 92. While shown as being formed from a single piece of material, the main body 88 may be formed from multiple pieces and need not be tubular or circumferentially complete and continuous. The second core connector 86 may be formed of any suitable material such as various plastics and metals and is shown in the drawings as being formed from a metal material.

The second core connector 86 may also include a lock 98 adapted to couple with the first core connector 20. The lock may include a biasing member 112, an actuator 106 acted upon by the biasing member 112, a trigger 111 (FIG. 5) and a lock element 100. The actuator 106 may be releasably held by the trigger 111 in a preloaded first position, and when the trigger 111 is released, the actuator 106 may move to a second position engaging and moving the lock element 100 to a locked position to couple together the first and second core connectors 20, 86.

One or more lock elements may be movable between a locked position engaging the first core connector 20 and an unlocked position permitting the first and second core connectors 20, 86 to be decoupled. As best shown in FIGS. 3 and 4, the lock element(s) may include one or more fingers 100 each adapted to selectively engage or radially overlap the first core connector 20. In the implementation shown, the fingers 100 each have an inwardly bent tab 102 and are connected to the main body 88 of the second core connector 86 at one end by a fastener 103 and generally free at their other end 104. The fingers 100 may be flexed inwardly to a locked position where the tabs 102 of each finger 100 extend radially into the openings 96 and at least partially into the socket 92. The fingers 100 may be flexible and resilient, like a spring, and may be yieldably biased or otherwise arranged so that they are in an unlocked position, with the tabs 102 not within the socket 92, when the fingers 100 are not acted upon by another object or otherwise moved to their locked position.

To control the movement of the fingers 100 from their unlocked to their locked positions, the lock 98 may also include the actuator 106. In the implementation shown, the actuator 106 includes a body 108 that may be tubular and slidably received over the main body 88 of the second core connector 86. In its first or retracted position, shown in FIG. 3, the actuator 106 is sufficiently spaced from the fingers 100 such that the fingers 100 are in their unflexed and unlocked position with the tabs 102 spaced from the socket 92. In its second or advanced position, shown in FIG. 4, the inside surface of the actuator 106 engages the fingers 100 and flexes them inwardly, moving the fingers 100 to and maintaining them in their locked position with the tabs 102 disposed at least partially within the socket 92. When the actuator 106 is moved back to its retracted position, the resilient nature of the fingers 100 (or other biasing force) causes the fingers 100 to return to their unlocked position. In this way, the fingers 100 may autonomously return to their unlocked position.

An inner cavity 110 of the actuator 106 that defines the inner surface may be sized to generally coaxially receive and slide over the main body 88 and fingers 100. A biasing member, shown as a spring 112, may be provided between a retainer 114 fixed on the second core section 15 and the actuator 106 to yieldably bias the actuator 106 toward its advanced position. To releasably retain the actuator 106 in its retracted position against the force of the spring 112, the actuator body 108 may include or be associated with one or more triggers 111. The triggers 111 may be any device or feature that releasably holds the actuator in its preloaded, first position. In at least some implementations, the triggers 111 engage a portion of the second core connector body 88 in their retracted position, and may be released from engagement with the body 88 to allow the actuator 106 to automatically move to its extended position. In the implementation shown, the triggers 111 include one or more releasable retainers that may be defined, as shown in FIG. 5, by cantilevered and flexible fingers 113 having a hook or catch 115 that is received within and extends through the secondary openings 97 in the body 88 when the actuator is in its retracted position. In this way, the actuator 106 will not move to its advanced position until the catches 115 are moved out of the openings 97. However, when the catches 115 are moved out of their associated openings 97, the actuator 106 can move to its advanced position as shown in FIG. 4, and in the implementation shown, this occurs automatically under the force of the spring without requiring separate, manual activity.

The second conduit connector 40 includes a main body 122 coupled to the second conduit section 16 at a first end 124 and having an opening 126 through which the second core section 15 passes. The main body 122 includes a cavity 128 in which the second core connector 86 is received and which is open to a second end 130 to provide access to the second core connector 86. The second end 130 of the main body 122 is adapted and sized for receipt within the sleeve 56 of the first conduit connector 34. The cavity 128 may include an entrance portion 132 of larger diameter than a rear portion 134 to provide clearance for the fingers 100 when they are in their unlocked position, as shown in FIG. 3. The smaller diameter rear portion 134 of the cavity 128 may closely receive the actuator 106 to maintain the second conduit connector 40, actuator 106 and second core connector 86 generally coaxially aligned to facilitate mating the first and second cable sections 11, 12 and their core and conduit connectors together.

In assembly of the cable, the first cable section 11 and second cable section 12 are coupled together by mating the first core and conduit connectors 20, 34 with the second core and conduit connectors 86, 40. In the implementation shown, this is accomplished by preloading the actuator 106 by displacing it against its spring 112 to its retracted position where the catches 115 are received within the secondary openings 97 in body 88 to hold the actuator 106 in that preloaded and retracted position. Thereafter, the second conduit connector 40 is inserted into the sleeve 56 of the first conduit connector 34.

When the second conduit connector 40 is sufficiently advanced into the first conduit connector 34 (i.e. they are sufficiently seated or mated together), the head 28 of the first core connector 20 is received within the second core connector 86. During this assembly step, the first core connector 20 releases the trigger of the actuator 106, which in the implementation shown is accomplished when the head 28 displaces the catches 115 from the secondary openings 97. When that has occurred, the actuator 106 moves, automatically under the force of its spring 112, to its advanced position. During this movement, the fingers 100 are increasingly received within the actuator 106 which causes the fingers 100 to flex inwardly toward their locked position. When the actuator 106 is fully advanced, the fingers 100 are fully in their locked positions, as shown in FIG. 4, with the tabs 102 received through the opening 96 in the body 88 of the second core connector 86. In this position, the tabs 102 are received within the neck 30 and behind the head 28 of the first core connector 20. Thus, further advancement of the first core connector 20 relative to the second core connector 86 is limited or prevented by engagement of the head 28 with the second core connector body 88. Removal of the first core connector 20 from the second core connector 86 is prevented by engagement of the tabs 102 with the head 28. This limits or prevents relative movement between the core connectors 20, 86 to securely couple the first and second core sections 13, 15 of the cable assembly 10. Outward movement of the fingers 100 is prevented because the fingers are sufficiently overlapped by the actuator 106 and thereby held in their locked positions. In the implementation shown, the actuator fully overlaps the fingers, although other arrangements are possible. This locks and couples together the core connectors 20, 86 to positively connect together the first and second core sections 13, 15. And the coupling together and locking (via the spring loaded actuator 106) of the core sections 13, 15 occurs automatically by simple insertion of the second conduit connector 40 into the first conduit connector 34 which trips or actuates the trigger and spring loaded actuator 106 to automatically lock together the first and second core connectors 20, 86.

Insertion of the second conduit connector 40 into the first conduit connector 34 may be limited by a spring 140 located within the outer tube 44 that bears at one end 142 against the first conduit connector 34 and at its other end 144 against the second conduit connector 40, as shown in FIG. 4. In this way, the spring 140 tends to bias the conduit connectors 34, 40 away from each other so that the connectors/conduit sections are in compression. In the implementation shown, the conduit sections each are fixed at separate abutments 146, 148 (FIG. 1) associated with the transmission and the vehicle shifter assembly 18 so the spring force tends to force each connector toward its associated abutment and places each conduit section in compression. Also, the extent of axial overlap between the first and second conduit connectors 34, 40 can be varied to permit adjustment of the overall length of the conduit sections of the cable system 10. In at least some implementations, the extent of axial overlap between the conduit connectors 34, 40 may be varied up to about 30 mm. This facilitates the accommodation of variations between parts in a production run of cable components, and variation inherent in the components of the system (e.g. transmission shifter) with which the cable system 10 is used.

With the second conduit connector 40 now received within and axially overlapped by the sleeve 56, the conduit connectors 34, 40 may be positively clamped or connected together. To do this, the collar 66 is rotated about the first conduit connector 34 to axially advance the sleeve 56. As the sleeve 56 is axially advanced, its first end 58 is moved relative to the cam surface 46 and flexed inwardly by the cam surface 46 to clamp or circumferentially engage and compress or squeeze against the outer surface 150 of the second conduit connector 40, as shown in FIG. 4. When the collar 66 has been rotated sufficiently to move the shoulder 82 out of registry with the retainer 74, the retainer 74 is moved to its advanced position under the force of its spring 84, as shown in FIGS. 5 and 6. Of course, the amount of rotation of the collar 66 that is needed to actuate the retainer 74 can be calibrated to correspond to a desired force of engagement between the sleeve 56 and second conduit connector 40. In at least some implementations, the retention force between the first and second conduit connectors will prevent separation of the conduit connectors under a force of 80N or more. This will ensure that a desired force connecting together the first and second conduit connectors 34, 40 is achieved before the retainer 74 is actuated.

And, correspondingly, actuation of the retainer 74 can provide visual confirmation that the conduit connectors 34, 40 are adequately connected together to reduce the likelihood of installation errors. Further visual confirmation can be achieved with visible indicia on the retainer 74 and outer tube 44, such as stripes or lines, that are aligned when the retainer is in its advanced position. When the retainer 74 is advanced, opposite rotation of the collar 66 is prevented and the sleeve 56 is maintained in its advanced position frictionally gripping the second conduit connector 40. This positively locks together the first and second conduit sections 14, 16 and provides visual confirmation that the conduit sections 14, 16 are connected together with sufficient force. To increase the frictional engagement of the sleeve 56 and second conduit connector 40, the sleeve 56 may include inwardly extending nubs 152 that may compress against and/or dig into the second conduit connector 40 during assembly. The nubs may be formed of any suitable material, and may be sharp, inclined (e.g. against or counter to the direction of movement when the conduit connectors are separated) or otherwise arranged to better engage and/or dig into the outer surface of the second conduit connector 40. In one form, two nubs 152 are provided for each finger 62 on the sleeve 56, and the nubs 152 may be metal that is overmolded in an otherwise plastic part.

To decouple the cable sections 11, 12, the retainer 74 is manually moved to its retracted position and held there while the collar 66 is rotated in the direction that axially retracts the collar 66. This dual action release, namely, sliding/retraction of the retainer 74 and subsequent rotation of the collar 66, greatly inhibits unintended disengagement of the clamp 54 and decoupling of the cable sections. When the shoulder 82 is aligned with the retainer 74, the retainer 74 can be released so its end 80 axially engages the shoulder 82 and need not be further held. Return of the collar 66 to its retracted position will axially retract the sleeve 56 and thereby release the clamping force the sleeve 56 was providing on the second conduit connector 40. The second conduit connector 40 can then be withdrawn from the sleeve 56 to expose the still coupled together first and second core connectors 20, 86. Then, the actuator 106 can be axially retracted against the force of its spring 112 to its retracted position wherein the actuator is held by engagement of the catches 115 within the secondary openings 97 of the body 88. In doing so, the resiliency of the fingers 100 causes them to autonomously return to their unflexed/unlocked positions where their tabs 102 are no longer engaging the first core connector 20. The first core connector 20 can then be withdrawn from the second core connector 86 which returns the cable system 10 to the decoupled position shown in FIGS. 3 and 5.

Accordingly, in at least the implementation shown, the cable system 10 permits the combined length of the conduit sections 14, 16 to be adjusted by permitting variable depth of insertion of the second conduit connector into the clamp 54 and/or first conduit connector. In this regard, the surface of the second conduit connector that is engaged by the clamp may be generally smooth, which is to say free of discrete features (like steps, ribs, grooves, etc) that may be engaged by the clamp or other lock feature. In this way, there is an infinite range of positions in which the first and second conduit sections may be coupled together. This facilitates accommodating production variances and tolerances within the various cable section components. Further, by appropriate axial positioning of the core connectors 20, 86, coupling of the core sections 13, 15 can be assured when the conduit sections 14, 16 are coupled together. And the core sections 13, 15 may be positively locked together automatically, that is, without requiring installation activity separate from coupling together the conduit connectors 14, 16. Therefore, an installer need only be concerned with proper coupling of the conduit connectors 34, 40 during assembly to ensure complete coupling together of the cable sections 11, 12.

While the forms of the invention herein disclosed constitute presently preferred embodiments, many others are possible. It is not intended herein to mention all the possible equivalent forms or ramifications of the invention. For example, while certain features of the core and conduit connectors were noted as being tubular or annular or the like, these components could be any suitable shape and arranged in any desired manner to interconnect the core and conduit sections of the cable. It is understood that the terms used herein are merely descriptive, rather than limiting, and that various changes may be made without departing from the spirit or scope of the invention.

The invention claimed is:

1. A multi-piece shifter cable system, comprising:
   a first cable section including a first core and a first core connector coupled to the first core;
   a second cable section having a second core and a second core connector coupled to the second core; and
   a lock associated with the second core connector and adapted to couple the second core connector with the first core connector, the lock including:
      a biasing member,
      an actuator acted upon by the biasing member for movement from a preloaded first position to a second position,
      a trigger engaged with the actuator to releasably hold the actuator in its preloaded first position against the force of the biasing member and releasable from the actuator to permit the actuator to move to its second position, and
      a lock element movable between a locked position engaging the first core connector to maintain the first and second core connectors coupled together and an unlocked position permitting the first and second core connectors to be decoupled, the lock element being moved from its unlocked to its locked position by the actuator when the actuator moves from its first position to its second position,
   wherein engagement of the first core connector and second core connector releases the trigger from engagement with the actuator to permit the actuator to move from its first position to its second position and thereby move the lock element to its locked position to couple together the first core connector and second core connector.

2. The cable system of claim 1 wherein at least a portion of the first core connector is coaxially received within the second core connector and engages the trigger to release the trigger so that the actuator moves to its second position and the lock element is moved to its locked position to limit relative movement between the first and second core connectors.

3. The cable system of claim 2 wherein the lock element is yieldably biased toward its unlocked position such that when not acted upon by the actuator, the lock element returns toward its unlocked position to facilitate separation of the first core connector and second core connector.

4. The cable system of claim 2 wherein the actuator is located radially outwardly of the lock element and is movable between a first position not causing the lock element to engage the first core connector and a second position overlying the lock element and maintaining the lock element in its locked position.

5. The cable system of claim 1 wherein the trigger includes a releasable retainer engaged with the second core connector when the actuator is in its first position, and the first core connector engages and displaces the retainer from the second core connector to release the trigger and permit the actuator to move to its second position automatically under the force of the biasing member.

6. The cable system of claim 5 wherein the second core connector includes a socket adapted to receive at least part of the first core connector, and the releasable retainer includes a catch at least partially received within the socket when the actuator is in its first position, and wherein the first core connector engages the catch and displaces the catch from the socket when the first core connector is at least partially received within the socket.

7. The cable system of claim 1 wherein the lock element includes one or more fingers each adapted to engage the first core connector when the lock is in its locked position.

8. The cable system of claim 7 wherein the first core connector is coaxially received within the second core connector and the lock element fingers are moved radially inwardly to engage the first core connector when the lock is in its locked position.

9. The cable system of claim 8 wherein the lock element fingers are yieldably biased toward a position not engaging the first core connector such that when not acted upon by the actuator the lock element fingers move away from the first core connector to facilitate separation of the first core connector and second core connector.

10. A multi-piece shifter cable system, comprising:
    a first cable section including a first core and a first conduit;
    a first conduit connector coupled to the first conduit and including a clamp;
    a second cable section having a second core and a second conduit; and
    a second conduit connector coupled to the second conduit, the clamp having a disengaged position permitting relative movement between the first and second conduit connectors and an engaged position engaging the second conduit connector to inhibit relative movement between the first and second conduit connectors wherein the clamp includes a sleeve and the first conduit connector includes a cam surface that is radially tapered and against which a portion of the sleeve is slidably moved when the clamp is moved from a disengaged position permitting relative axial movement between the first and second conduit connectors to an engaged position, the engagement of the cam surface and sleeve causing at least a portion of the sleeve to circumferentially engage the second conduit connector when the clamp is in its engaged position and thereby limit or prevent relative axial movement between the first and second conduit connectors.

11. The cable system of claim 10 wherein the second conduit connector includes an outer surface and the clamp circumferentially engages the outer surface of the second conduit connector.

12. The cable system of claim 10 wherein the clamp may engage the second conduit connector in an infinite number of positions.

13. The cable system of claim 12 wherein the second conduit connector includes a surface adapted to be engaged by the clamp that is continuous and free of discrete features engageable by the clamp.

14. The cable system of claim 10 wherein the clamp includes an actuator that moves the sleeve relative to the cam surface to move the clamp from its disengaged position to its engaged position.

15. The cable system of claim 14 which also includes a cam feature associated with the actuator that axially displaces the actuator as the actuator is rotated from a first position associated with the disengaged position of the clamp to a second position associated with the engaged position of the clamp, and wherein the cam feature causes the actuator to move axially as it is rotated to slidably move the sleeve relative to the cam surface.

16. The cable system of claim 14 wherein the clamp also includes a retainer that holds the clamp in its engaged position and is releasable from to permit the clamp to return toward its disengaged position.

17. A multi-piece shifter cable system, comprising:
a first cable section including a first core and a first conduit;
a first core connector coupled to the first core;
a first conduit connector coupled to the first conduit and including a clamp;
a second cable section having a second core and a second conduit;
a second core connector coupled to the second core, including a lock associated with the second core connector and adapted to couple the second core connector with the first core connector, the lock including an actuator movable between a preloaded first position and a second position, a trigger engaged with the actuator to releasably hold the actuator in its preloaded first position and releasable from the actuator to permit the actuator to move to its second position, and a lock element movable by the actuator between a locked position engaging the first core connector and an unlocked position permitting the first and second core connectors to be decoupled, wherein engagement of the first core connector and second core connector releases the trigger from the actuator to permit the actuator to move from its first position to its second position and thereby move the lock element to its locked position to couple together the first core connector and second core connector; and
a second conduit connector coupled to the second conduit, the clamp having a disengaged position permitting relative movement between the first and second conduit connectors and an engaged position engaging the second conduit connector to inhibit relative movement between the first and second conduit connectors.

18. The cable system of claim 17 wherein the first core connector releases the trigger from the actuator when the first conduit connector and second conduit connector are seated together to automatically lock together the first and second core connectors and the clamp is moved to its engaged position to releasably maintain the relative position of the first and second conduit connectors to connect together the first and second core and conduit sections.

* * * * *